(12) United States Patent
Hsu (10) Patent No.: US 8,560,030 B2
(45) Date of Patent: Oct. 15, 2013

(54) COVER MEMBER OF A GLOBAL POSITIONING SYSTEM

(76) Inventor: Cheng-Chien Hsu, Sijhih (TW)

( * ) Notice: Subject to any disclaimer, the term of this patent is extended or adjusted under 35 U.S.C. 154(b) by 86 days.

(21) Appl. No.: 12/189,184

(22) Filed: Aug. 10, 2008

(65) Prior Publication Data
US 2010/0327711 A1   Dec. 30, 2010

(51) Int. Cl.
*H04M 1/00* (2006.01)
(52) U.S. Cl.
USPC .................................... 455/575.8; 455/347
(58) Field of Classification Search
USPC ............ 455/575.1, 575.8, 566, 347; 379/447, 379/450, 451, 453
See application file for complete search history.

(56) References Cited

U.S. PATENT DOCUMENTS

| 6,898,283 | B2 * | 5/2005 | Wycherley et al. | 379/433.11 |
| 2005/0017680 | A1 * | 1/2005 | Zhao et al. | 320/112 |
| 2007/0184691 | A1 * | 8/2007 | Perkins | 439/135 |

* cited by examiner

*Primary Examiner* — Christian Hannon
(74) *Attorney, Agent, or Firm* — Leong C. Lei (57) ABSTRACT

A host of a global positioning system is enclosed by a cover member having a joint member to connect the host, and the host has a butt joint member to connect the cover member. The joint member is conveniently assembled with and disassembled from the butt joint member, to assemble or disassemble the cover member on or from the host as needed. The host includes a rear cap, at least one location on which is connected with the cover member, and the rear cap has a joint member to connect the host, for assembling or disassembling the cover member on or from the host, as needed. Therefore, the cover member and the rear cap of the global positioning system can be replaced respectively by one own according to a user's needs and preferences, to match color and shape of the global positioning system to be used.

3 Claims, 15 Drawing Sheets

Fig. 8 for# COVER MEMBER OF A GLOBAL POSITIONING SYSTEM

BACKGROUND OF THE INVENTION a) Field of the Invention

The present invention relates to a global positioning system, and more particularly to a cover member of a global positioning system, color and shape of which can be changed by a user alone depending on his or her needs or preferences.

b) Description of the Prior Art

In modern life, convenience is one of the rather important quests; therefore, a lot of electronic devices are emerging continuously, such as a global positioning system or a cellular phone which can add a lot of conveniences to human lives.

Following progressiveness of technologies, many electronic products that can increase conveniences in lives are advanced continuously too, and the technology of satellite navigation also progresses significantly that functions of the products are improved continuously by vendors of the satellite navigation devices to attract consumers, including the improvement in a quality of navigation, an operation interface, a display screen and a size, as well as a design toward a lightweight and compact satellite navigation device.

However, when there is no much difference in a technology standard of functions and size among vendors of satellite navigation devices, consumers will pay attention to an entire shape; wherein, upon assembling a housing of a global positioning system sold on markets, its host is usually enclosed by a fixed joining method that the host is mostly enclosed by a front cap and a rear cap, and then the front cap and the rear cap are fixed and joined. On the other hand, during manufacturing, a manufacturer will choose a color scheme and shape, or carry out a design in accordance with the consumer's needs; the consumer will not be able to replace a design of the shape of the cover member alone, nor can the consumer match the color of the cover member according to his or her preferences.

Accordingly, how to solve the problems and shortcomings of the aforementioned global positioning system that the consumer cannot replace the cover member alone is an aim of improvement with research and development by the present inventor and related vendors.

SUMMARY OF THE INVENTION

The primary object of the present invention is to provide a cover member of a global positioning system, wherein an exterior of a host of the global positioning system is enclosed by a cover member, with the cover member being provided with a joint member to connect the host, and the host being provided with a butt joint member to connect the cover member. The joint member can be conveniently assembled with and disassembled from the butt joint member, allowing the cover member to be assembled on and disassembled from the host as needed. By the aforementioned technologies, the problem existing in the conventional global positioning system that the cover member cannot be replaced by a user alone, can be solved, thereby achieving the practicability and progressiveness that the cover member of the global positioning system can be replaced by the user alone, according to his or her needs and preferences to match the color and shape of the global positioning system to be used.

Another object of the present invention is to provide a cover member of a global positioning system, wherein an exterior of a host of a global positioning system is enclosed by a cover member, with the host being provided with a rear cap, at least one location of which being connected to the cover member, cover member and the rear cap are provided with joint members to connect the host, and the host is provided with butt joint members to connect the cover member. The joint members can be conveniently assembled with and disassembled from the butt joint members, allowing the cover member and the rear cap to be assembled on and disassembled from the host as needed. By the aforementioned technologies, the problem existing in the conventional global positioning system that the cover member cannot be replaced by a user alone, can be solved, thereby achieving the practicability and progressiveness that the cover member and the rear cap of the global positioning system can be replaced respectively by the user alone, according to his or her needs and preferences to match the color and shape of the global positioning system to be used.

Still another object of the present invention is to provide a cover member of a global positioning system, wherein an upper side of a cover member is provided with an eave which is extended away from a host. The eave is able to effectively block sun from directly irradiating on a panel, so as to prevent the panel from forming an imperfect picture by being irradiated by sun.

To enable a further understanding of the said objectives and the technological methods of the invention herein, the brief description of the drawings below is followed by the detailed description of the preferred embodiments.

BRIEF DESCRIPTION OF THE DRAWINGS

FIG. 3-1 shows a second schematic view of an implementation of a preferred embodiment of the present invention.

FIG. 3-2 shows a third schematic view of an implementation of a preferred embodiment of the present invention.

FIG. 4-1 shows a fifth schematic view of an implementation of a preferred embodiment of the present invention.

FIG. 4-2 shows a sixth schematic view of an implementation of a preferred embodiment of the present invention.

FIG. 5-1 shows an eighth schematic view of an implementation of a preferred embodiment of the present invention.

FIG. 5-2 shows a ninth schematic view of an implementation of a preferred embodiment of the present invention.

FIG. 6-1 shows an eleventh schematic view of an implementation of a preferred embodiment of the present invention.

DETAILED DESCRIPTION OF THE PREFERRED EMBODIMENTS

Figure 1:
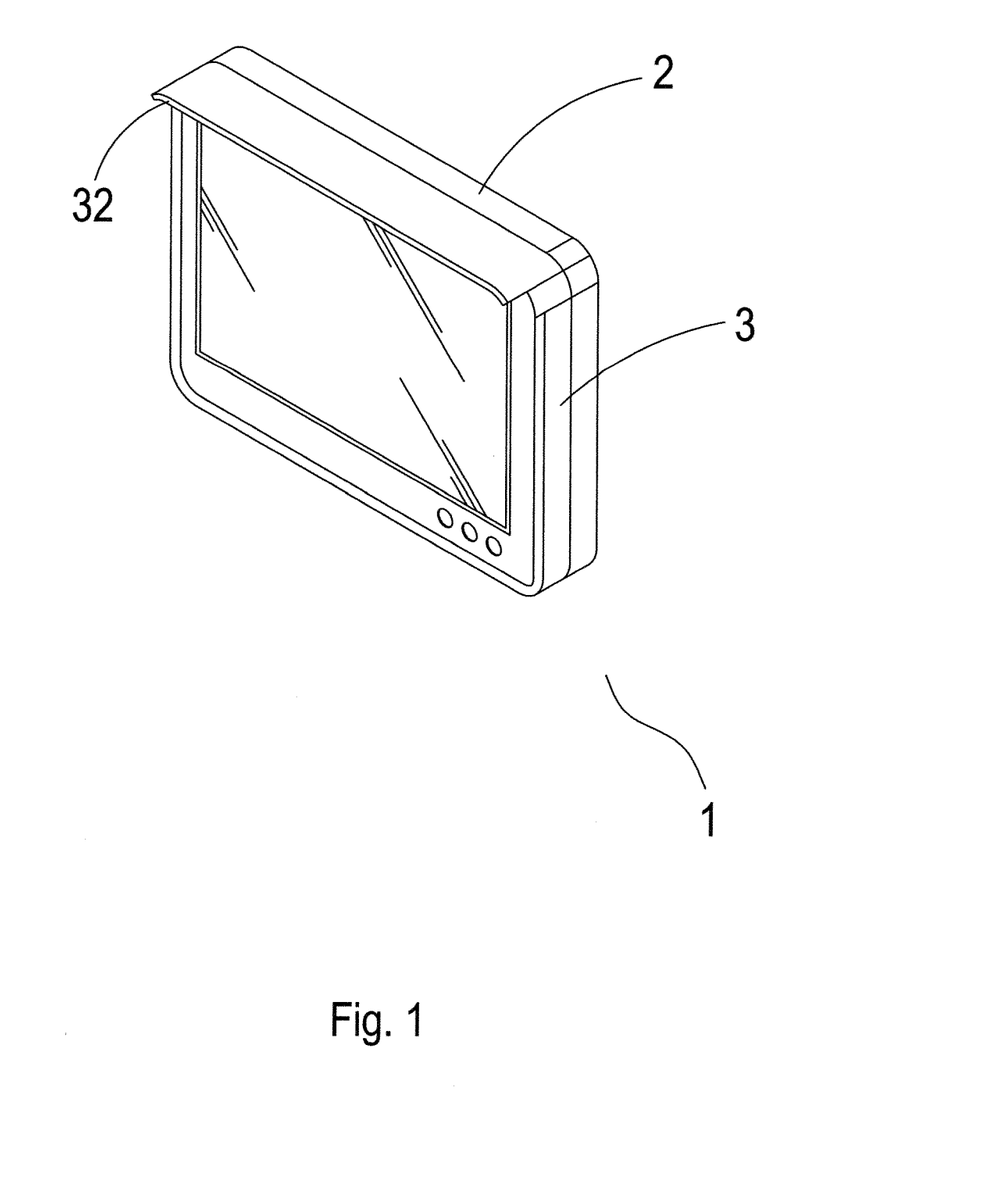
FIG. 1 shows a three-dimensional view of a preferred embodiment of the present invention.
Figure 2:
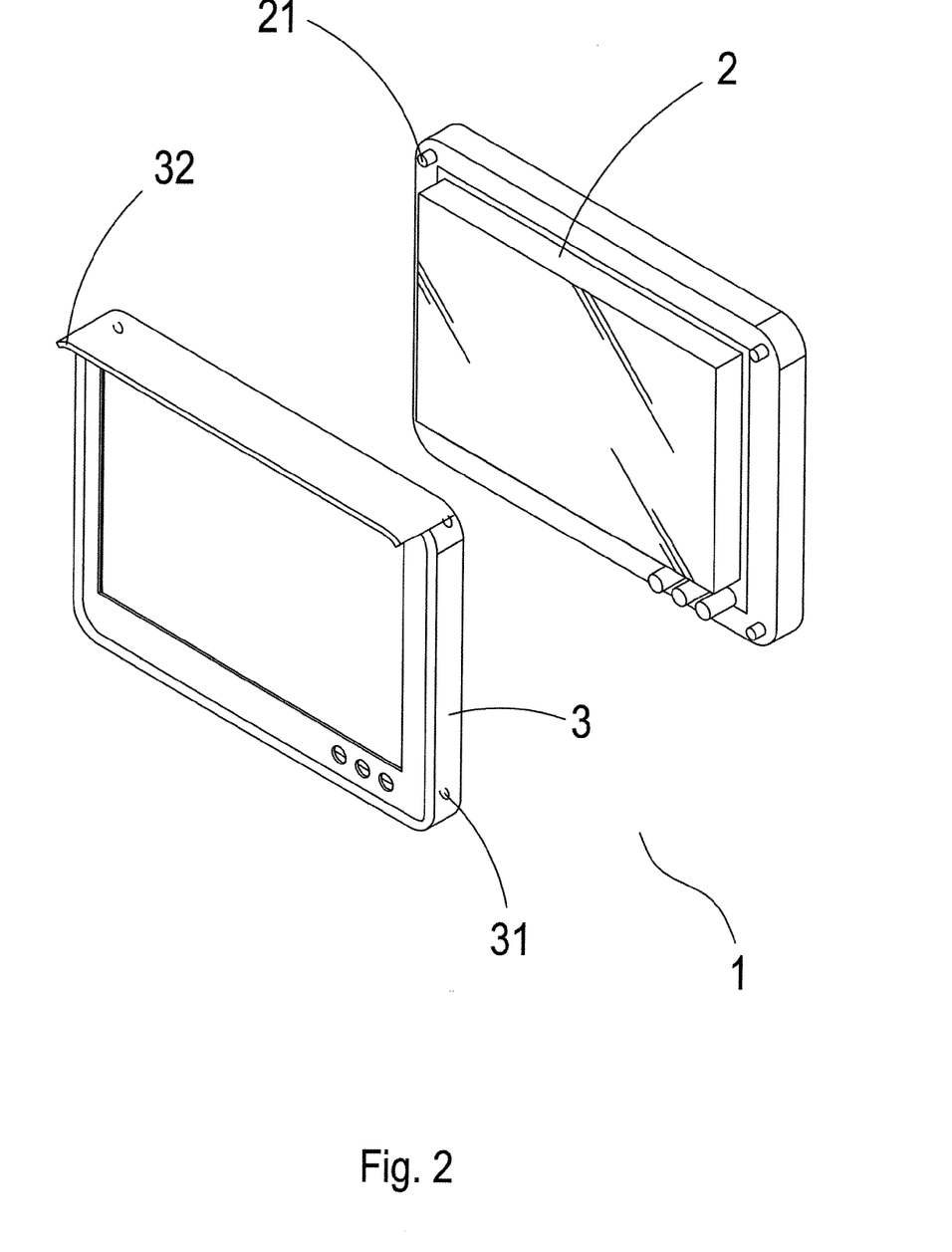
FIG. 2 shows an exploded view of a preferred embodiment of the present invention.

Referring to FIG. 1 and FIG. 2, it shows a three-dimensional view and an exploded view, of a preferred embodiment of the present invention. A global positioning system 1 of the present invention comprises primarily a host 2, an exterior of which is enclosed by a cover member 3. The cover member 3 is provided with a joint member 31, and a position on the host 2 corresponding to the joint member 31 is provided with a butt joint member 21 which is assembled with the joint member 31. In addition, an upper side of the cover member 3 is provided with an eave 32 which is extended away from the host 2.

Figure 3:
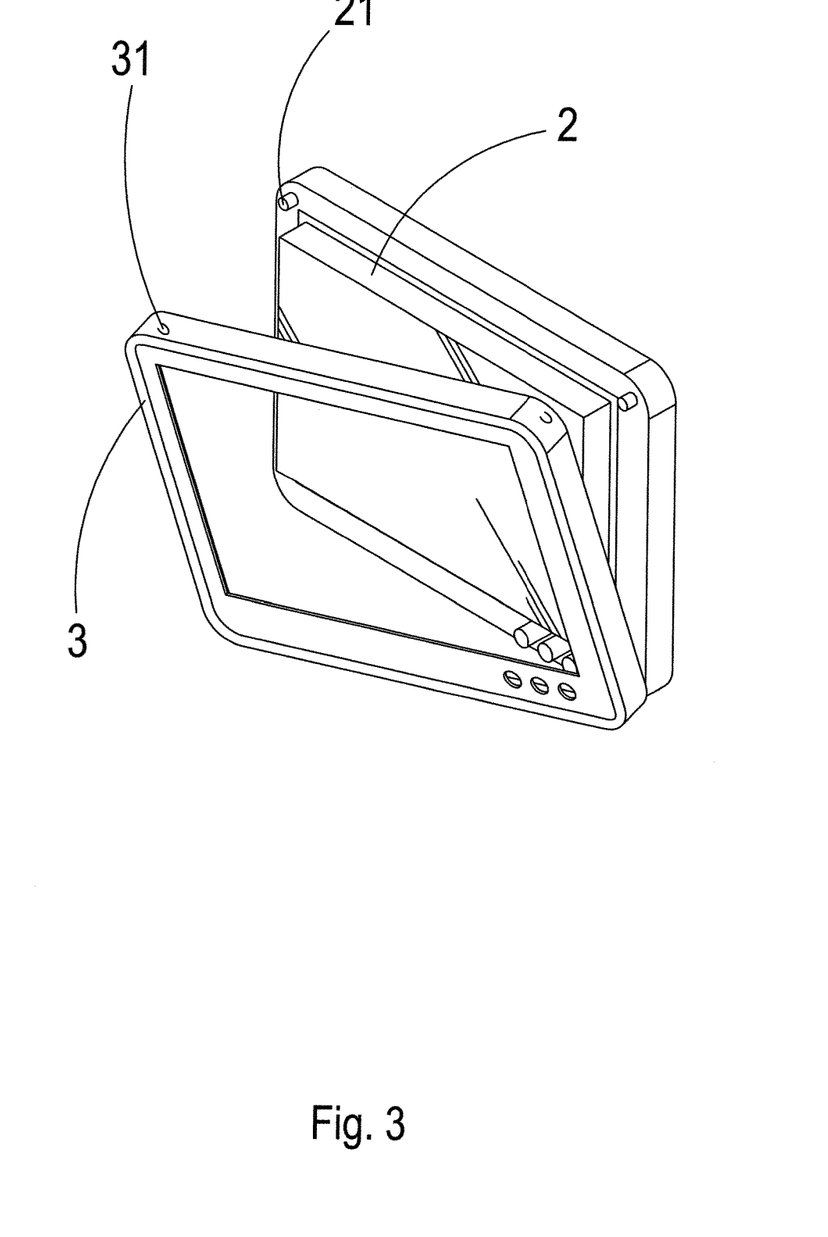
FIG. 3 shows a first schematic view of an implementation of a preferred embodiment of the present invention.
Figure 31:
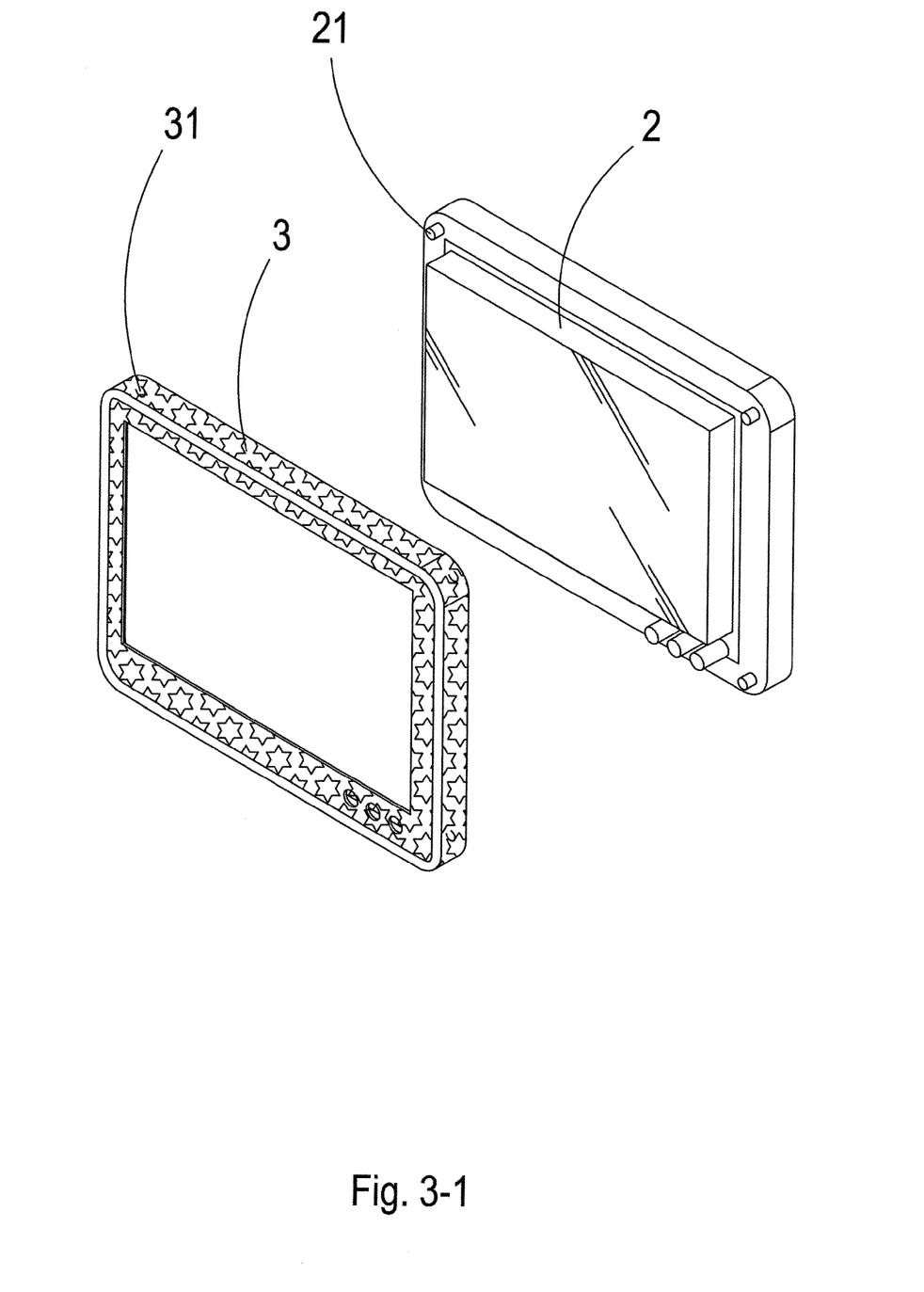
Figure 32:
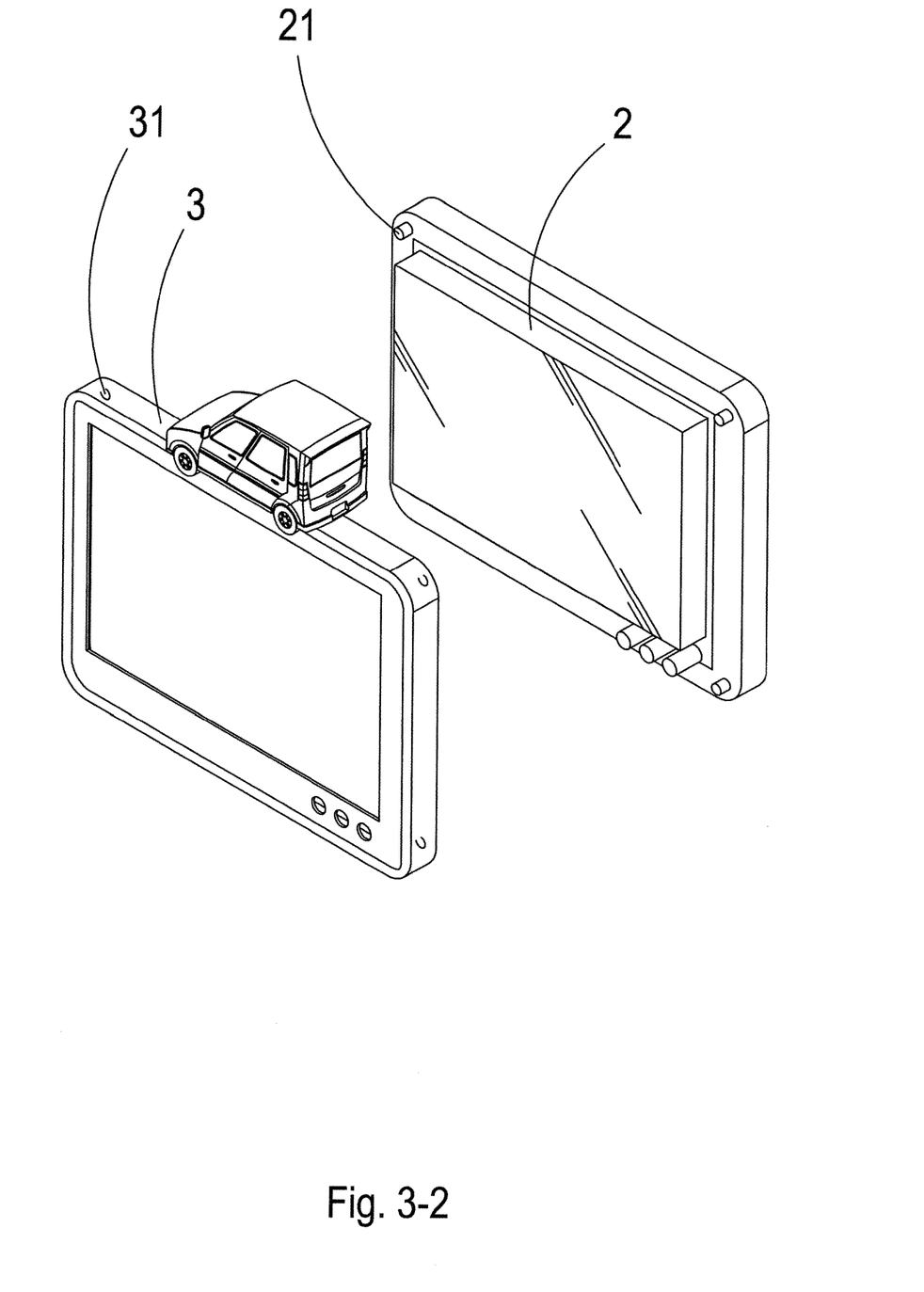

Referring to FIGS. 3, 3-1 and 3-2, it shows a first schematic view of an implementation, a second schematic view of an implementation and a third schematic view of an implementation, of a preferred embodiment of the present invention. When the cover member 3 encloses a front end of the host 2, the cover member 3 is provided with the joint member 31 to connect the host 2, with the joint member 31 being able to be assembled on and disassembled from the butt joint member 21 of the host 2 by hooking, joining magnetically, screwing or joining with a fastener; whereas, the butt joint member 21 can be a locking slot, a magnetic butt joint, a screw hole or a butt joint of a fastener. Moreover, when the joint member 31 is disassembled from the butt joint member 21 of the host 2, the cover member 3 of various color or shape can be installed on the host 2, allowing the appearance and shape at the front end of the host 2 to be replaced by a user alone according to his or her preferences.

Figure 4:
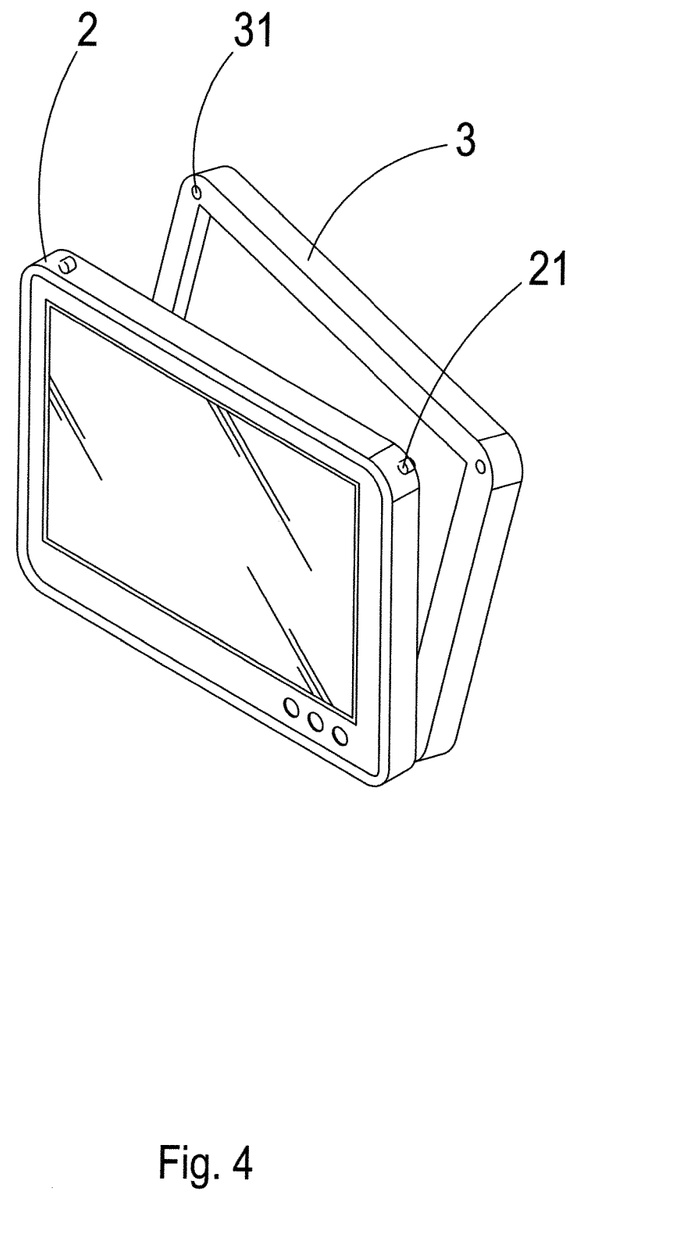
FIG. 4 shows a fourth schematic view of an implementation of a preferred embodiment of the present invention.
Figure 41:
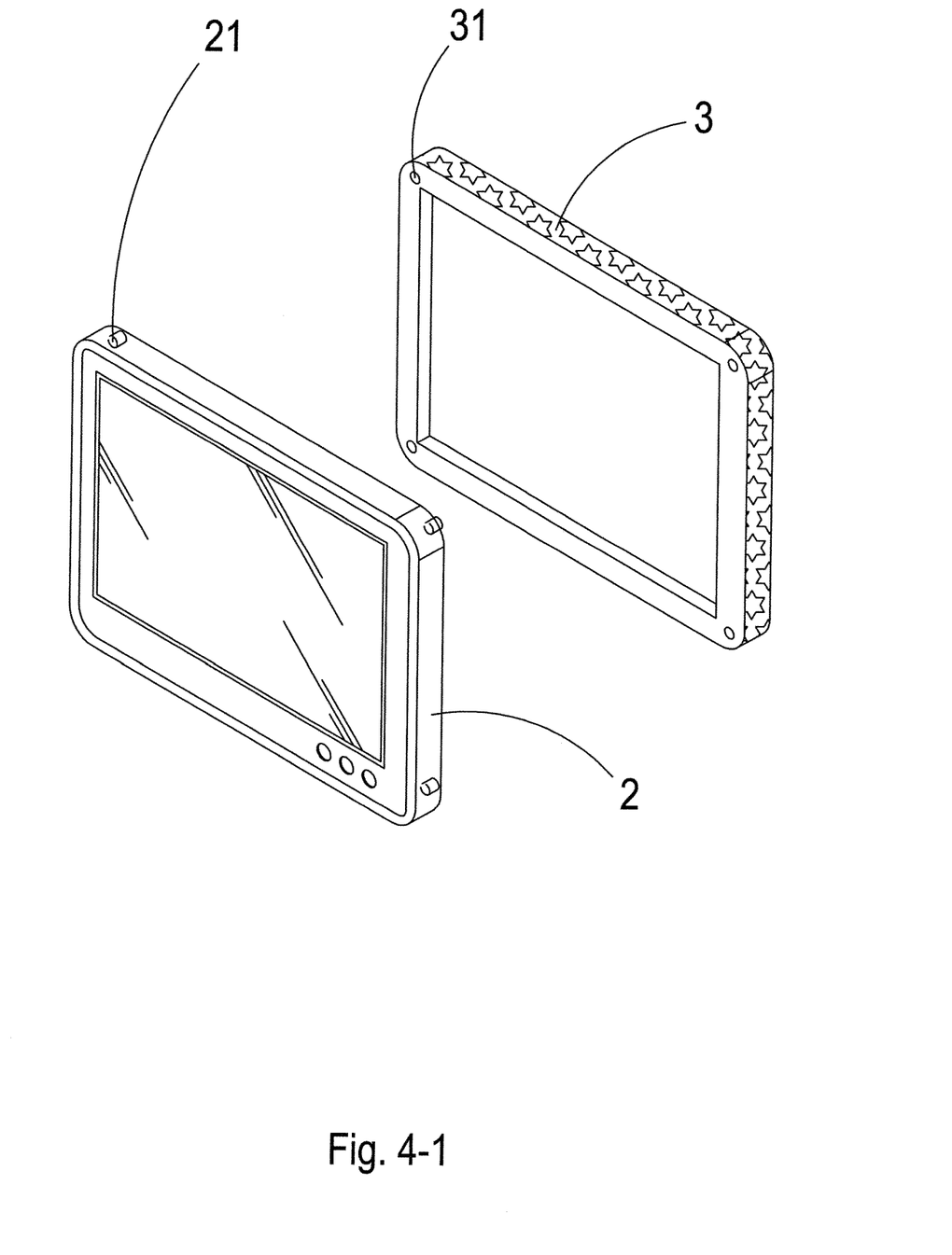
Figure 42:
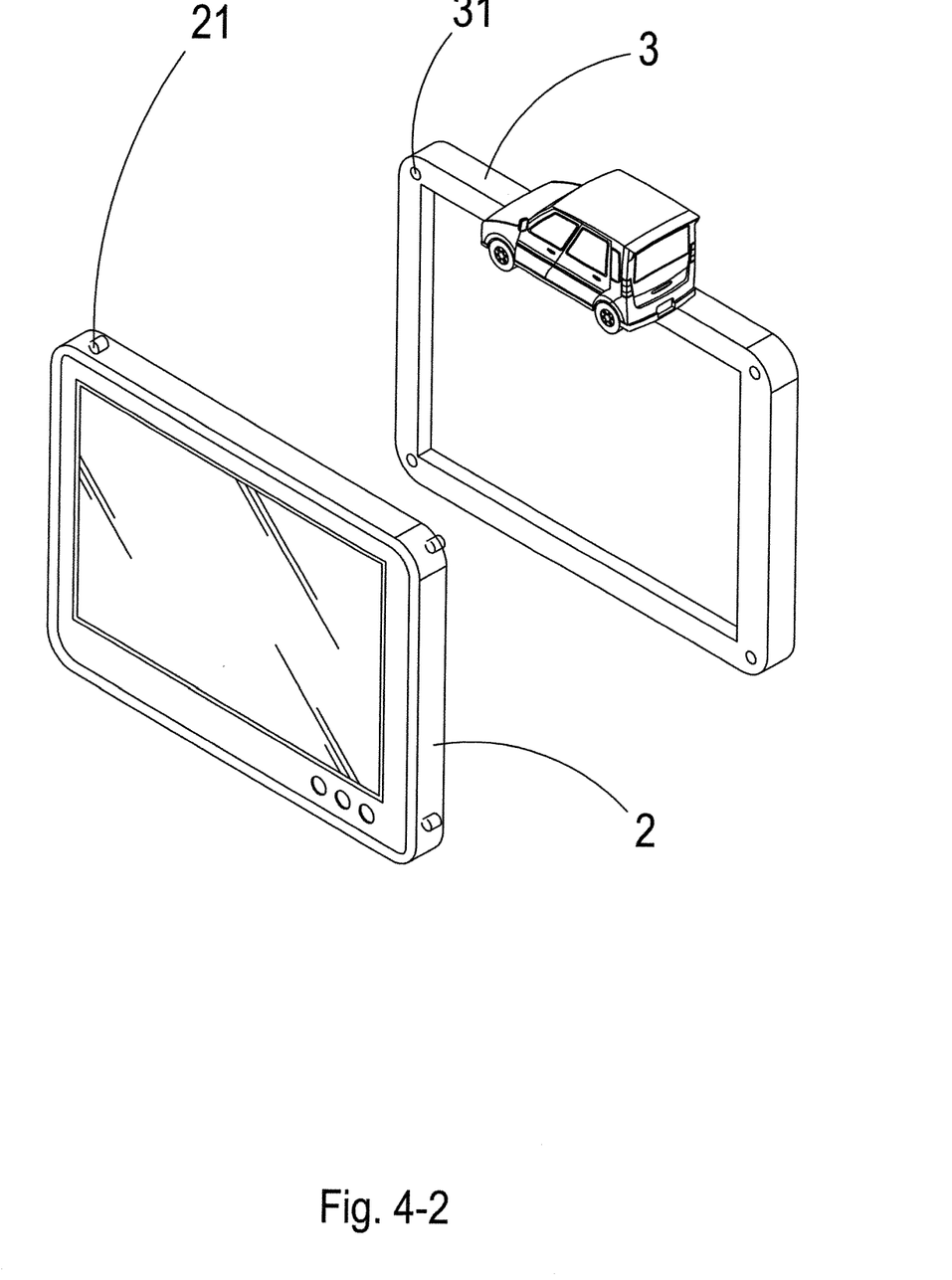

Referring to FIGS. 4, 4-1 and 4-2, it shows a fourth schematic view of an implementation, a fifth schematic view of an implementation and a sixth schematic view of an implementation, of a preferred embodiment of the present invention. When the cover member 3 encloses a rear end of the host 2, the cover member 3 is provided with the joint member 31 to connect the host 2, with the joint member 31 being able to be assembled on and disassembled from the butt joint member 21 of the host 2 by hooking, joining magnetically, screwing or joining with a fastener; whereas, the butt joint member 21 can be a locking slot, a magnetic butt joint, a screw hole or a butt joint of a fastener. Moreover, when the joint member 31 is disassembled from the butt joint member 21 of the host 2, the cover member 3 of various color or shape can be installed on the host 2, allowing the appearance and shape at the rear end of the host 2 to be replaced by the user alone according to his or her preferences.

Figure 5:
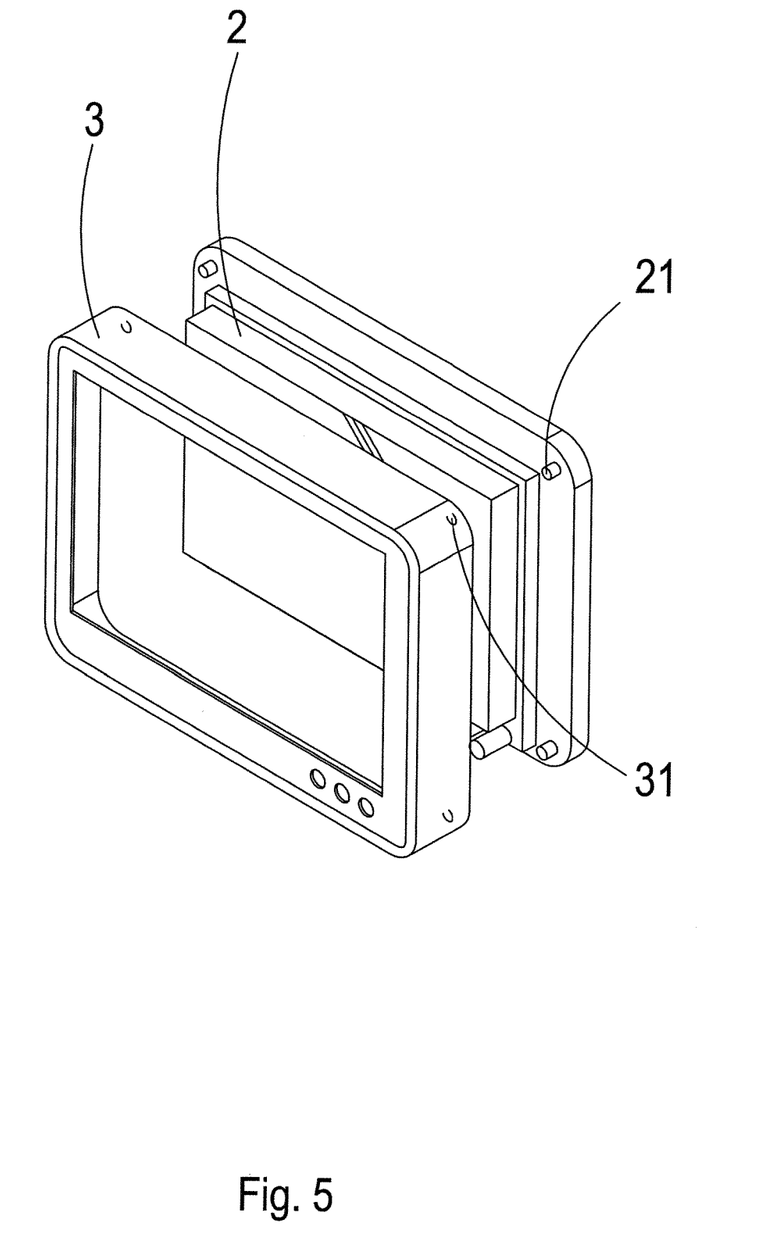
FIG. 5 shows a seventh schematic view of an implementation of a preferred embodiment of the present invention.
Figure 51:
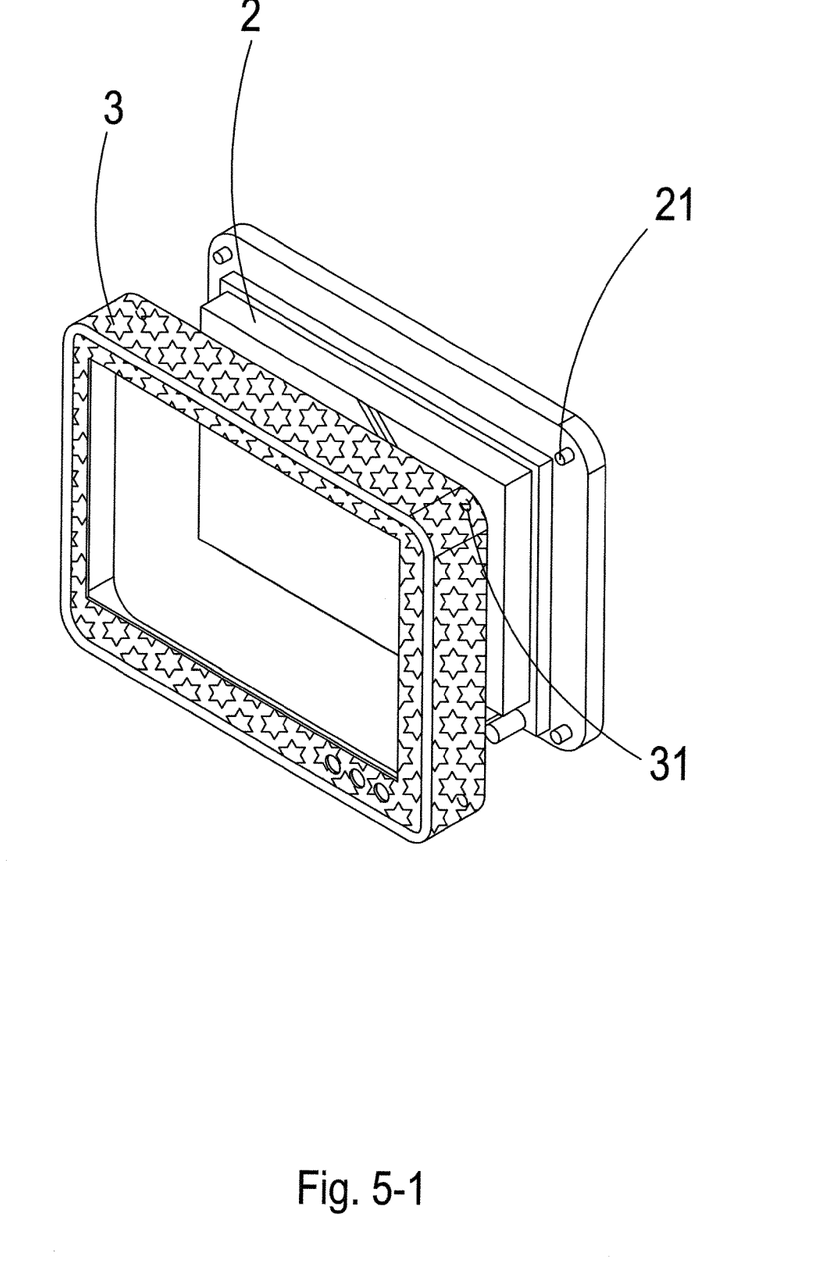
Figure 52:
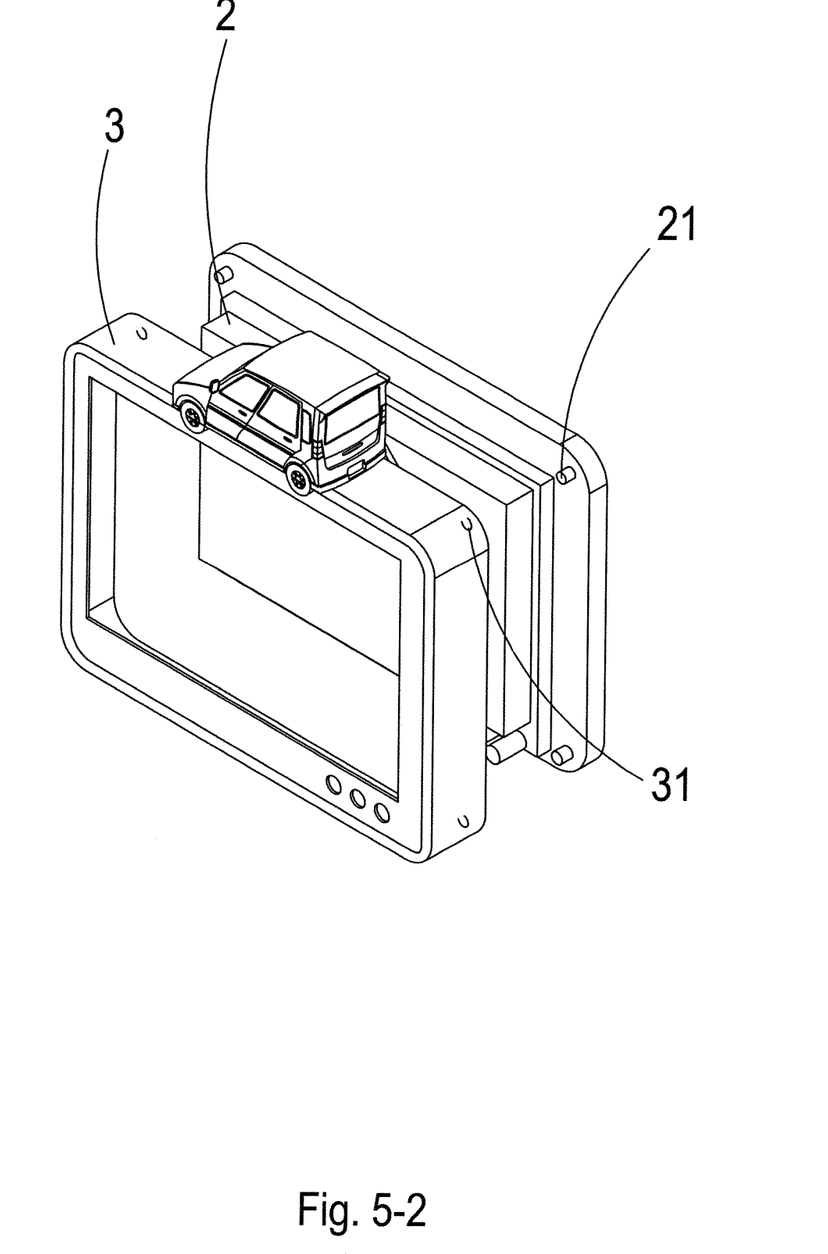

Referring to FIGS. 5, 5-1 and 5-2, it shows a seventh schematic view of an implementation, an eighth schematic view of an implementation and a ninth schematic view of an implementation, of a preferred embodiment of the present invention. When the cover member 3 encloses the entire host 2, the cover member 3 is provided with the joint member 31 to connect the host 2, with the joint member 31 being able to be assembled on and disassembled from the butt joint member 21 of the host 2 by hooking, joining magnetically, screwing or joining with a fastener; whereas, the butt joint member 21 can be a locking slot, a magnetic butt joint, a screw hole or a butt joint of a fastener. Moreover, when the joint member 31 is disassembled from the butt joint member 21 of the host 2, the cover member 3 of various color or shape can be installed on the host 2, allowing the appearance and shape of the entire host 2 to be replaced by the user alone according to his or her preferences.

Figure 6:
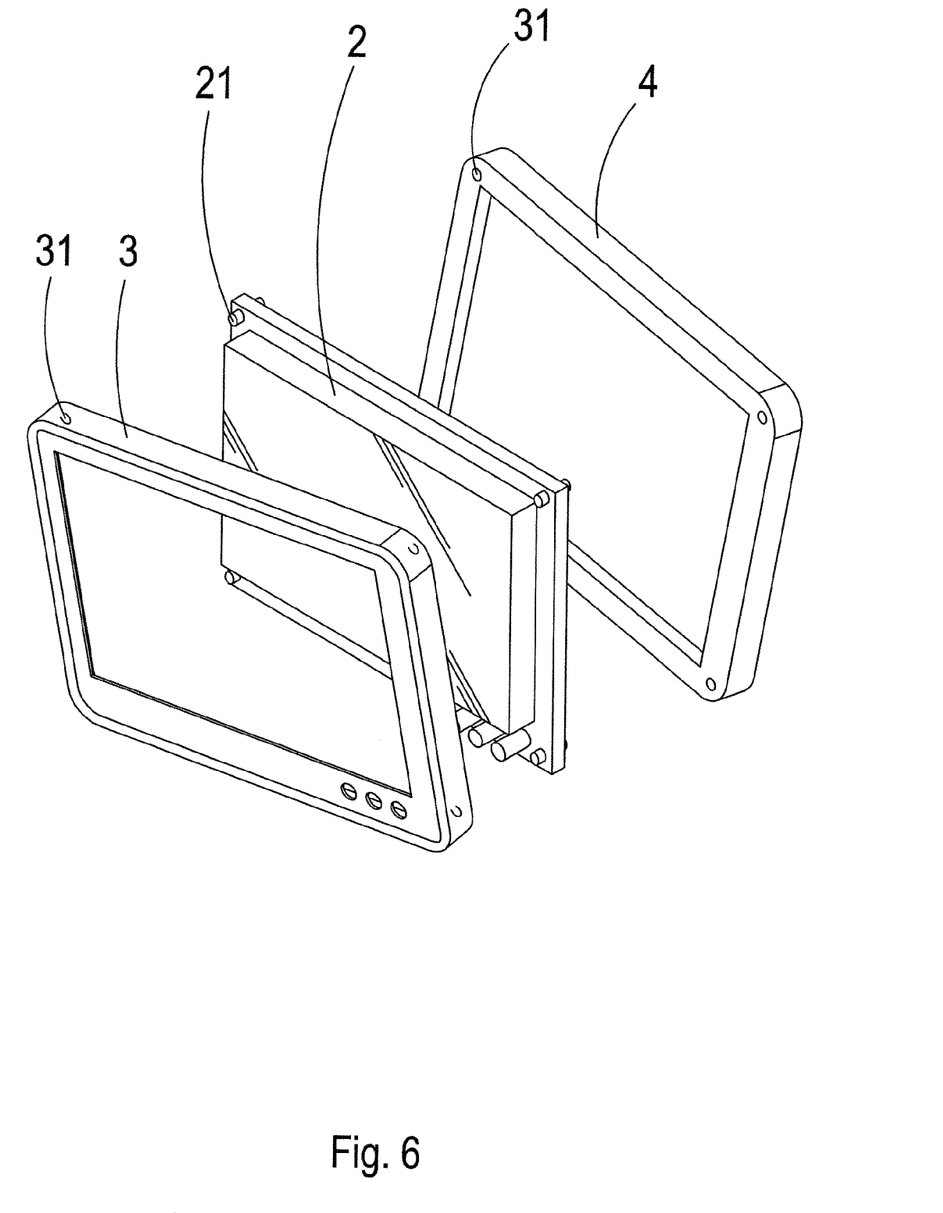
FIG. 6 shows a tenth schematic view of an implementation of a preferred embodiment of the present invention.
Figure 61:
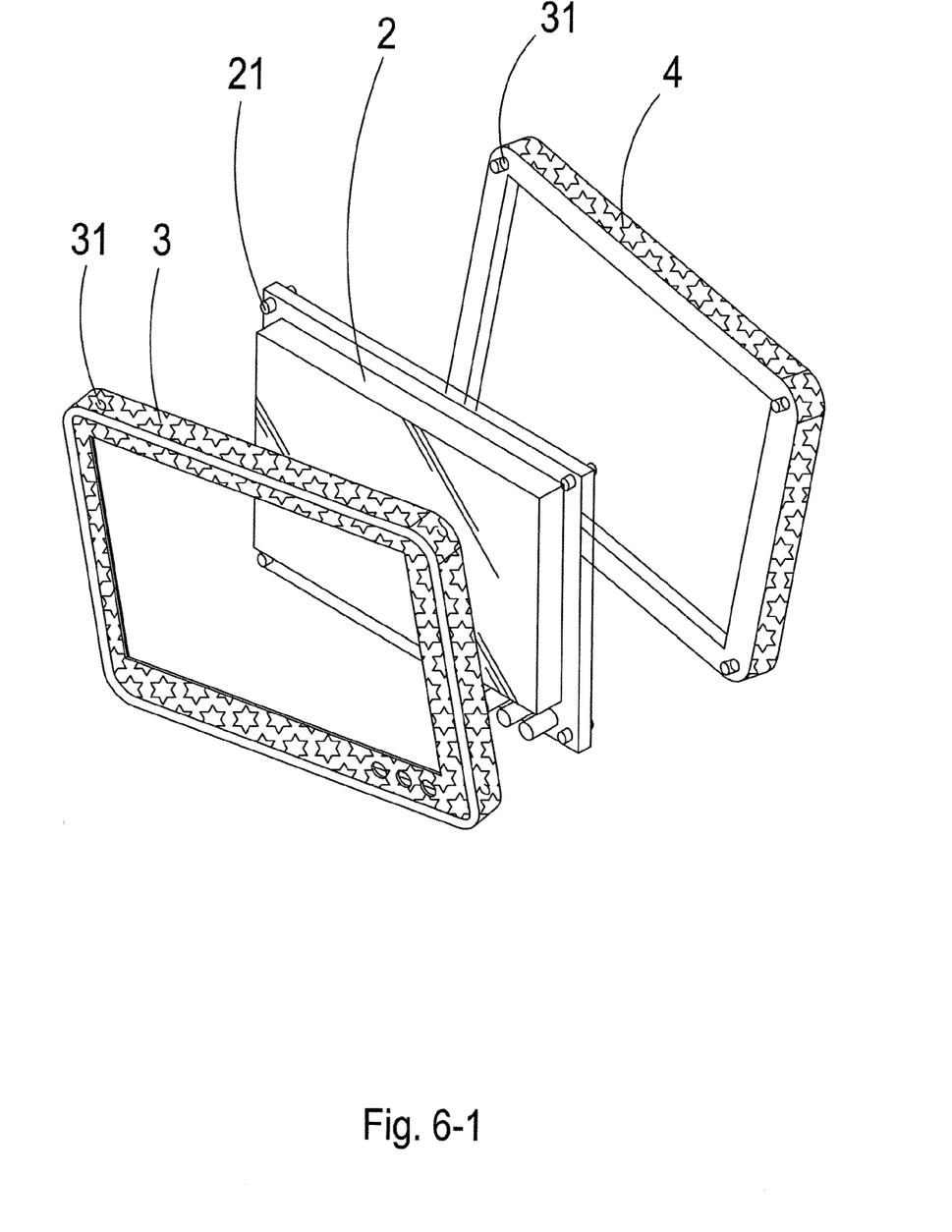

Referring to FIGS. 6 and 6-1, it shows a tenth schematic view of an implementation and an eleventh schematic view of an implementation, of a preferred embodiment of the present invention. The exterior of the host 2 is enclosed by the cover member 3, and the host 2 is provided with a rear cap 4, at least one position on which is connected to the cover member 3. The cover member 3 and the rear cap 4 are provided with the joint members 31 to connect the host 2 at a same time. The joint members 31 can be assembled on and disassembled from the butt joint members 21 of the host 2 respectively, by hooking, joining magnetically, screwing or joining with fasteners; whereas, the butt joint members 21 can be locking slots, magnetic butt joints, screw holes or butt joints of fasteners. Moreover, when the joint members 31 are disassembled from the butt joints members 21 of the host 2, the cover member 3 and the rear cap 4 of various color or shape can be installed on the host 2, allowing the appearance and shape of the entire host 2 to be replaced by the user alone according to his or her preferences.

Figure 7:
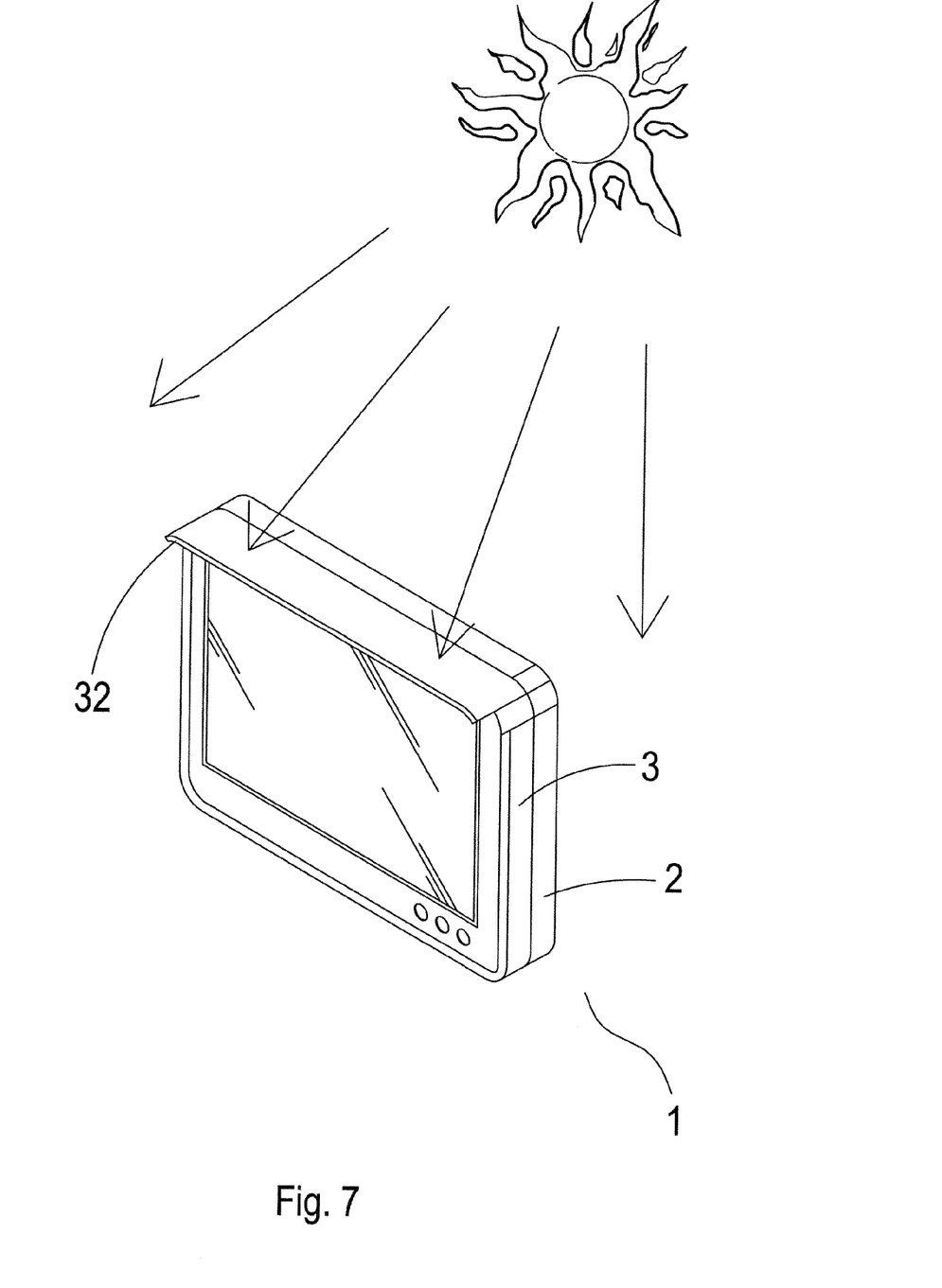
FIG. 7 shows a twelfth schematic view of an implementation of a preferred embodiment of the present invention.
Figure 8:
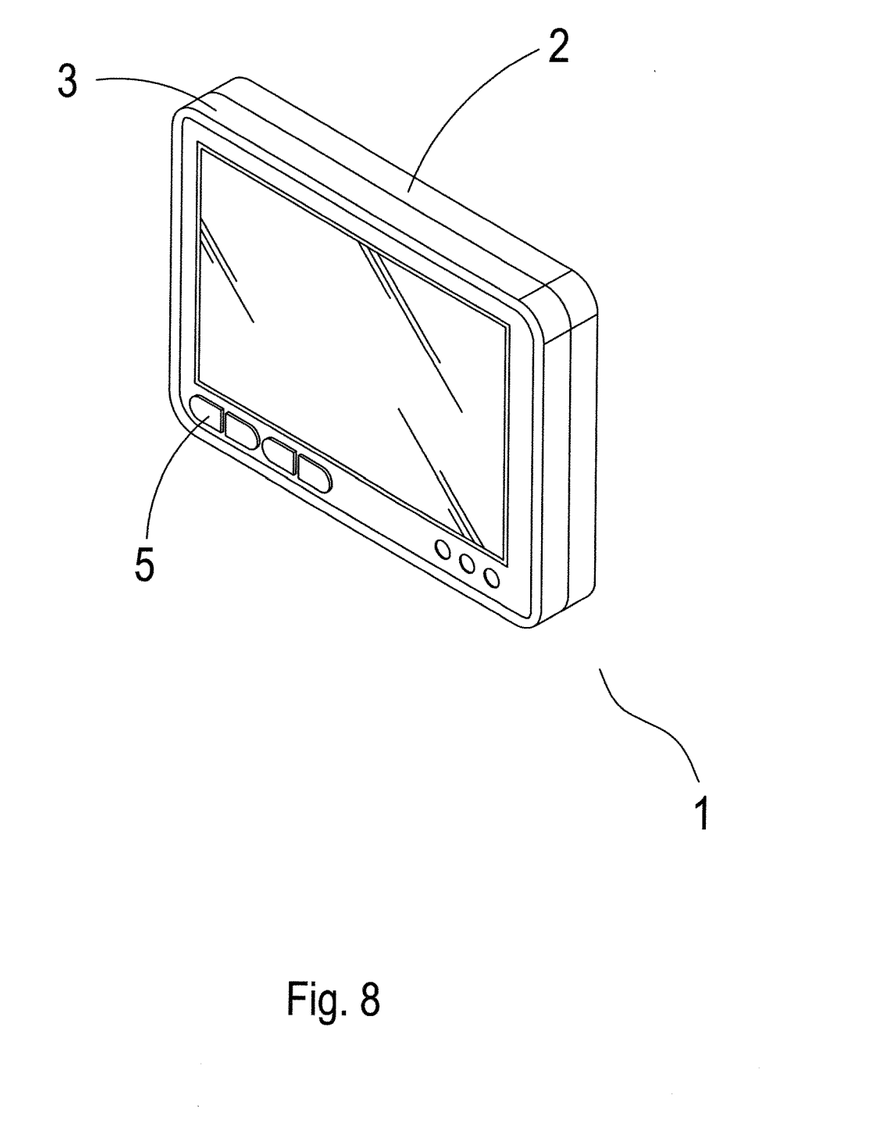
FIG. 8 shows a thirteenth schematic view of an implementation of a preferred embodiment of the present invention.

Referring to FIGS. 7 and 8, it shows a twelfth schematic view of an implementation and a thirteenth schematic view of an implementation, of a preferred embodiment of the present invention. An upper side of the cover member 3 is provided with an eave 32 which is extended outward from the host 2 and is at a proper distance to the host 2, so as to block sun from directly irradiating on a panel to form an imperfect picture by irradiation of sun, when the user is using the global positioning system 1 that is directly irradiated by sun. The cover member 3 can be provided with an input unit 5, an input signal of which can be transmitted to the host 2 through a transmission interface.

Referring to all the drawings, the present invention is actually provided with following advantages in comparison with the prior art:

1. The cover member 3 is provided with the joint member 31 to connect the host 2, and the host 2 is provided with the butt joint member 21 to connect the cover member 3. The joint member 31 is conveniently assembled with and disassembled from the butt joint member 21, allowing the cover member 3 to be assembled on and disassembled from the host 2 as needed; therefore, the cover member 3 of the global positioning system 1 can be replaced by one own according to the user's needs and preferences, in order to match the color and the shape of the global positioning system to be used.
2. The exterior of the host 2 is enclosed by the cover member 3, the host 2 is provided with the rear cap 4, at least one position of which can be connected to the cover member 3, the cover member 3 and the rear cap 4 are provided with the joint members 31 to connect the host 2, whereas the host 2 is provided with the butt joint members 21 to connect the cover member 3 and the rear cap 4. The joint members 31 are conveniently assembled on and disassembled from the butt joint members 21, allowing the cover member 3 and the rear cap 4 to be assembled on and disassembled from the host 2 as needed; therefore, the cover member 3 and the rear cap 4 of the global positioning system 1 can be replaced by one own according to the user's needs and preferences to match the color and the shape of the global positioning system 1 to be used.
3. The upper side of the cover member 3 is provided with the eave 32 which is extended outward from the host 2 and is at the proper distance to the host 2, such that when the user is using the global positioning system 1 that is directly irradiated by sun, the eave 32 can block sun from directly irradiating on the panel to form the imperfect picture.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A cover member of a global positioning system, with that global positioning system comprising a host, an exterior of the host being enclosed by a cover member, and the host being provided with a rear cap, at least one location on the rear cap being connected to the cover member; the cover member and the rear cap being provided with joint members to connect the host, and the host being provided with butt joint members to connect the cover member and the rear cap, allowing the cover member and the rear cap to be assembled on and disassembled from the host as needed, an upper side of the cover member is extended with an eave which is away from the host, wherein the butt joint members are magnetic buff joints, and the joint members are magnetic joints which are separated with the magnetic butt joints, and the cover member is provided with an input unit, an input signal of which is transmitted to the host for use.

2. The cover member of a global positioning system, according to claim 1, wherein the magnetic butt joints are replaced with locking slots, and the magnetic joints are hooks which are separated with the locking slots.

3. The cover member of a global positioning system, according to claim 1, wherein the magnetic butt joints are replaced with screw holes, and the magnetic joints are screws which are separated with the screw holes.

* * * * *